United States Patent [19]

Lang et al.

[11] Patent Number: 4,477,992

[45] Date of Patent: Oct. 23, 1984

[54] APPARATUS FOR BAITING LONGLINE FISHING GEAR

[75] Inventors: Curtis E. Lang, 22340 - 132 Ave., Maple Ridge, B.C., Canada; Robert J. Roe, Richmond, Canada

[73] Assignee: Curtis E. Lang, Vancouver, Canada

[21] Appl. No.: 346,901

[22] Filed: Feb. 8, 1982

[30] Foreign Application Priority Data

Apr. 10, 1981 [CA] Canada ................................... 375164

[51] Int. Cl.³ .............................................. A01K 97/00
[52] U.S. Cl. .......................................... 43/4; 43/27.4
[58] Field of Search .............................. 43/4, 4.5, 27.4

[56] References Cited

U.S. PATENT DOCUMENTS

| | | | |
|---|---|---|---|
| Re. 28,380 | 4/1975 | Tison | 43/27.4 X |
| 3,377,733 | 4/1968 | Godo | 43/4 |
| 3,841,011 | 10/1974 | Tison | 43/4 |
| 4,250,648 | 2/1981 | Jacobsen | 43/4 |

FOREIGN PATENT DOCUMENTS 1562116  3/1980  United Kingdom ................. 43/27.4

Primary Examiner—Nicholas P. Godici
Assistant Examiner—P. Weston Musselman, Jr.
Attorney, Agent, or Firm—Chernoff, Vilhauer, McClung, Birdwell & Stenzel

[57] ABSTRACT

A novel apparatus for semi-automatically baiting the hooks of long-line used in commercial deep sea fishing. The apparatus includes a bait holding receptacle, a slotted separator positioned in or in association with the receptacle and extending from substantially end to end thereof, whereby ground-line with leader periodically attached to the ground-line is passed behind the separator such that a gangion portion of the leader extends through the slot in the separator and the hook of the leader secures itself to a piece of bait held in the bait holding receptacle.

8 Claims, 22 Drawing Figures

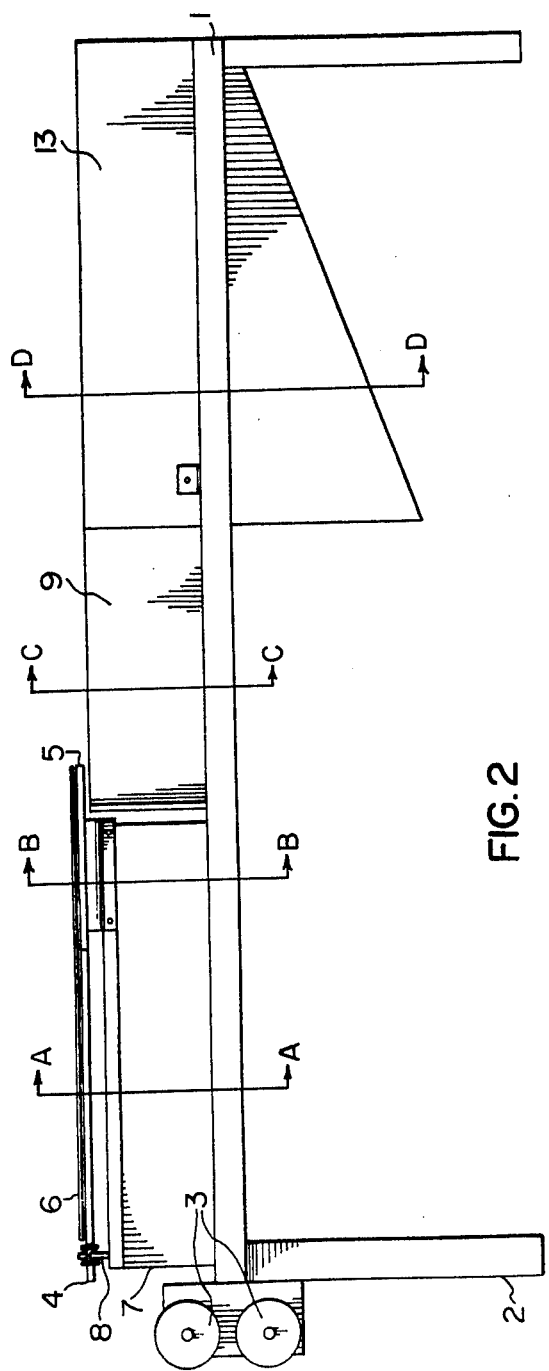
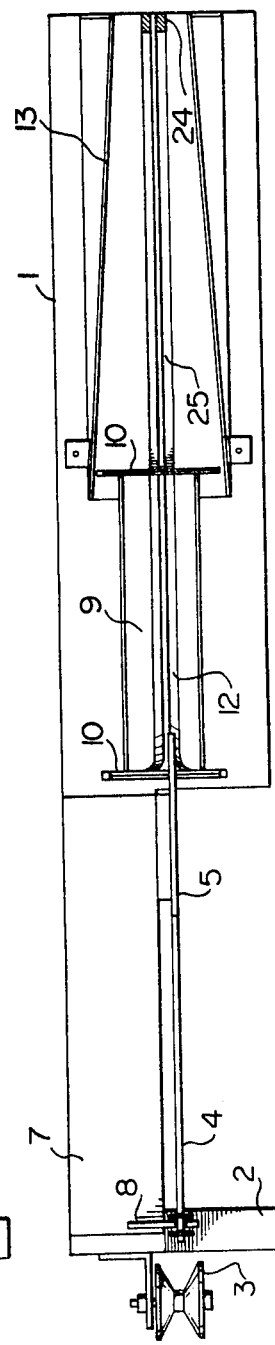
FIG. 2
FIG. 3

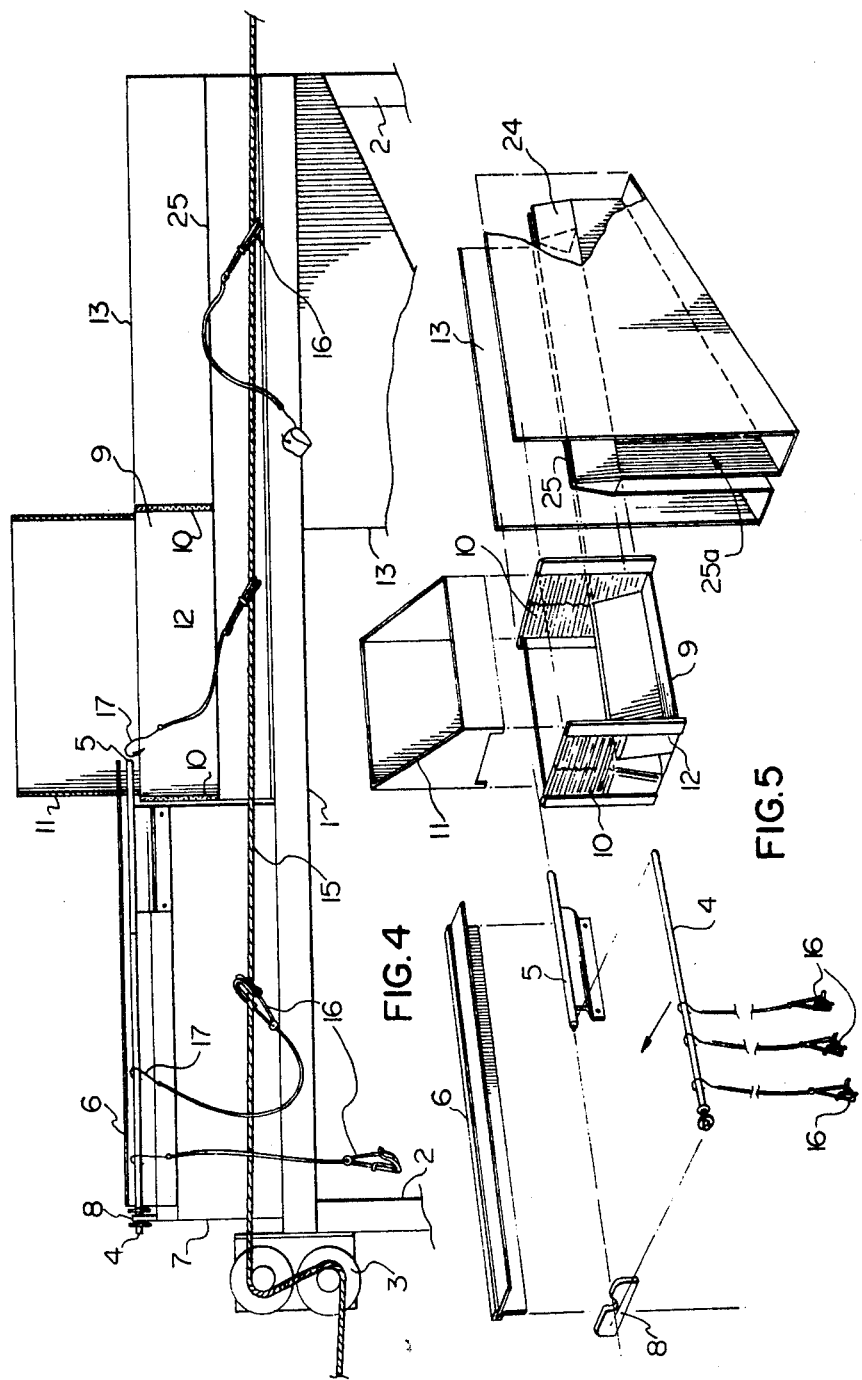

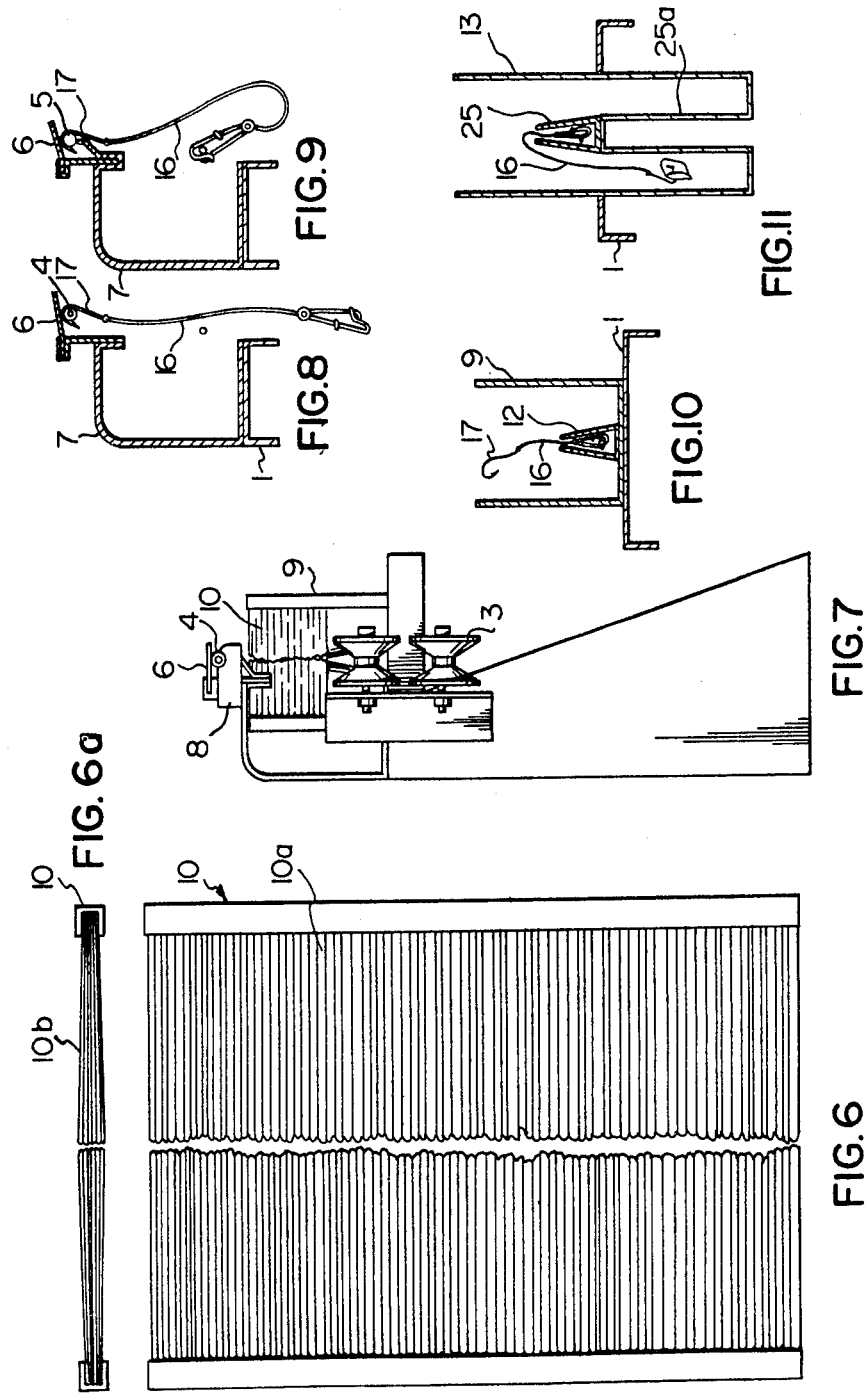

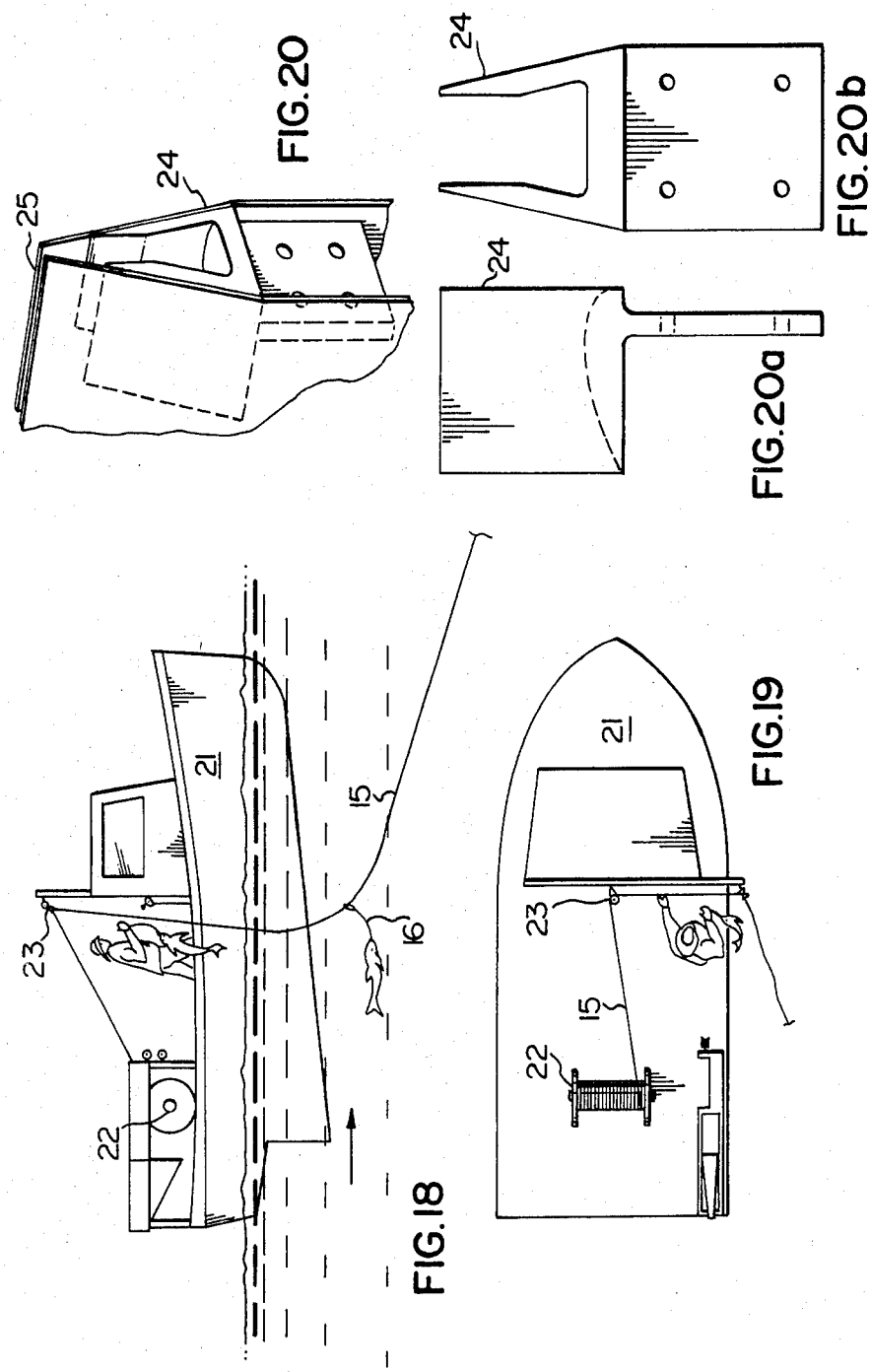

APPARATUS FOR BAITING LONGLINE FISHING GEAR

FIELD OF THE INVENTION

This invention is directed to a novel apparatus and method for semi-automatically baiting the hooks of long-line used in commercial deep sea fishing.

BACKGROUND OF THE INVENTION

Long-line gear used in commercial fishing consists of a ground-line that is laid out along the ocean floor and anchored in place at each end. Leaders with baited hooks are attached at intervals along the ground-line. The gear is left on the ocean floor for sufficient time to attract fish, then is hauled back to the boat where the fish are removed and the gear stored. Baiting of the hooks is now done either by hand or by devices available on the market.

The two main types of long-line gear in use are either fixed gear or snap gear. Both are set out simply by fixing an anchor to one end, casting it off astern and driving the boat away. In the case of fixed gear, the leaders are tied permanently to the ground-line and either are stored in long racks (8 to 12 feet) with the hooks on the rack and the ground-line hanging in bunts, or are coiled into tubs with the leaders lain across the coil. This latter procedure requires skill, and is prone to fouling.

In the case of snap gear, the leaders are attached to the ground-line with a snap of spring wire and are quickly removable. The ground-line is coiled onto a hydraulically powered reel or drum, and the leaders are stored separately on small racks or boxes, usually about 2 to 3 feet long. This system stows very compactly (perhaps 1/6 of the deck space for the same amount of gear) and is not likely to foul when setting out or picking up.

Both fixed and snap gear have been used traditionally and are baited by hand. Fixed gear always requires a crew of at least two (usually three or four) to operate it as one man removes the fish and another tends the coiling or hanging of the leaders. Snap gear can be worked single-handed.

The traditional fixed gear and snap gear hand baited systems were the rule until about 1968 when MUSTAD of Norway introduced the semi-automatic baiting "AUTOLINE" (U.S. Pat. No. 3,377,733—Godo) followed in 1969 by the MARCO semi-automatic baiting "TILINER" (U.S. Pat. Nos. Re. 28,380, 3,903,632 and 3,626,630—Tison). Both systems use fixed gear only (as does Andrews—U.S. Pat. No. 4,015,359).

The MUSTAD (Godo) system uses a baiting box that aligns single pieces of precisely cut bait into the path of a hook that also is carefully aligned so that the hook pierces the bait at the strongest spot (through the spine). Although this baits the hook firmly, the heads and tails of the bait fish must be thrown away as they do not fit the aligning mechanism. This represents a loss of approximately 15% of the bait weight. Also, the precision of alignment requires a complex mechanism that is costly, is prone to breakdown, and is limited to expensive herring bait. Also, since MUSTAD uses fixed gear hung in racks, the broken leaders must be replaced each time the gear is hauled and stored, otherwise the bunts of ground-line would hang too low and get fouled. This necessitates a large crew (six to eight men) working at re-tying leaders so the gear may be properly racked, and even with several men at this job, when a large number of broken leaders are hauled in at once, the hauling must be halted to allow the crew to catch up. (Broken leaders are usual, as the fish worry and bite the leader when caught.)

MUSTAD, because of its precisely formed hook guide is limited to one hook size, and in using racks, requires a large volume of space, as the gear must be spread loosely so as not to foul when setting. Boats 65 feet long or more are needed to accomodate their standard system. Special systems are believed to have been fitted on smaller vessels of 40 feet or more.

MARCO (Tison) also uses fixed gear, but it is stored on spoked reels. This feature allows a broken leader to go unreplaced as the ground-line is coiled on the hub of the reel and the gear can be worked without fouling even with gaps in the hook spacing. However, this means the gaps where hooks are missing do not catch fish and as the gear is used over and over, more hooks would be lost continually. Therefore, the MARCO gear can be stored and set without replacing broken leaders, but it is not desirable. So the same problem as MUSTAD exists, i.e. the hauling process must be frequently halted to repair leaders.

MARCO uses a bait-box or hopper wherein the ground-line passes above the bait and the leaders hang down. They show the leader occupying a path angled downward about 30° from the ground-line. In fact, this is believed impossible since the leader will follow the ground-line in a parallel path since nothing holds the free end of the leader away from the ground-line once it is into the bait.

In MARCO (as shown) the ground line (except when a float is passing above) passes through the bait-mass. The friction of the line, and the knots in it, damages the bait, reducing it to pulp, and lowers the bait's ability to stay firmly on the hooks.

Also, MARCO passes the ground-line above the bait, so that the hook follows upwards, thereby pulling against the bait towards the open top of the hopper. This results in the bait-mass giving way before the hook and reducing the pressure that is required to force the hook-point into the chunks of bait. Thus the hook breaks the surface sometimes, passing over the bait, rather than through it.

Moreover, in MARCO, the entry and exit sides of the bait box are made of metal, with a slotted entry, causing the problem of hooks catching and blunting their points. MARCO, because of its metal entry and exit to the hopper is necessarily limited to a narrow range of hook sizes.

MARCO, in using reels, is somewhat more compact than the MUSTAD system, needing a boat of 45 feet or more. However, the reels must be carried from the coiling stand to the setting stand, and they are heavy. This represents extra labour. Also because of their reel system, only two skates may be used to form a string.

Both MUSTAD and MARCO, being fixed gear and using racks or spoked reels, require a minimum crew of two men—one to control the boat and attend to the fish as they come up to the side, and another to hang the hooks in the racks or reels. This crew requirement is not related to the need for repairing gear but exists in addition to it.

Andrews (U.S. Pat. No. 4,015,359) shows only a baiting device, and nothing for hauling or storing the gear. His baiter is of a type similar to MUSTAD in that it aligns a single bait-piece into the path of a hook that is also carefully aligned, therefore requiring many moving parts that are carefully made. This unit is expensive to manufacture and maintain.

All the referenced patents use fixed gear, thereby limiting variation in hook spacing. This is because once the leaders are tied to the ground line, considerable labour would be needed to retie them at different intervals In 1977, a new type of ground-line and leader made of monofilament was introduced to the world market. As monofilament is transparent and invisible to the fish, it catches them more efficiently and is thus becoming widely used. However it is also very stiff and springy and so is unsuitable to be hung on racks as in the MUSTAD system. The bunts would entangle with one another.

STATEMENT AND SUMMARY OF THE INVENTION

Our system uses a hopper or bait-box wherein the pre-cut bait is disposed in large quantities (fifty pounds or more). The hooks are drawn through the midst of this mass of bait chunks. Heads and tails may be used, as can squid, octopus or any other fish that can be cut into chunks. It is not limited to precisely-cut expensive herring chunks. It can use oddly shaped and amorphous pieces of bait material. Also, since the bait-box is simple in construction, the likelihood of breakdown is greatly reduced, as is the initial cost.

Our system, using detachable snap-on type leaders, avoids hauling interruptions because it allows broken leaders to be put aside and repaired off the boat. Thus the hauling can continue uninterrupted and time at sea can be spent fishing.

In our device, the ground-line is passed behind a separator which can be a tube positioned in or fixed to the bottom of the bait receptacle, or mounted or positioned in some other relationship with the bait receptacle. The function of the separator is to separate the ground-line and the end of the leader attached to the ground-line from the bait in the bait receptacle. The hook end of the leader passes through an elongated slot in the separator. The hook is released from a hook-holder and is released into the bait mass.

Our system can be operated single handedly, since only one man is needed to remove the leaders, with or without fish, as they come up to the rail. The ground-line needs no attention as it spools onto a drum. This is an advantage because many small boat longliners already work alone and would welcome a baiter suitable for their operation. This is the only automatic baiting system that can be worked by one man alone.

Our system lends itself readily to using monofilament ground-line and leaders. Since the mono ground-line stows on a drum, its springiness is not of consequence.

In our device, flat brushes (as used in an industrial sweeper) form the entry and exit sites. The brushes are firm enough to contain the bait and keep it from falling out the ends of the bait-box, but flexible enough to allow the ground-line, leader, snap and hook to pass freely through them. Also, the brushes are soft and cannot damage the hooks, lines or bait.

Since the ground-line and leader attachments pass on the non-bait side of the separator, thereby preventing contact between the bait and the attachment, line knots, and the like, no damage is caused to the bait by the attachments, line knots, and the like. As the bait remains firm, it stays more solidly on the hook, thereby increasing the average baiting effectiveness.

Our system, in using a separate, stationary drum for ground-line, and separate, portable racks for leaders, is most compact, fitting easily onto a 25 foot boat. This is a great advantage because most fishermen engaged in traditional longlining have small boats of about 30 feet.

Since different fish are hunted using different intervals (i.e. halibut—20 foot spacing, dogfish 3 foot spacing), users of existing fixed gear are required to keep different sets of gear made up, changing them as the seasonal fisheries change. The subject invention, using leader attachments, allows the user to vary spacing at will. He will thus require only one set of ground-lines, thereby reducing costs and labour. While the subject system has this feature in common with old style manually baited snap-gear, it is the only semi-automatic baiting system to have this feature. Due to the brushes being located at the entry and exit of the bait-box, a wide range of hook sizes may be used with our device without damage.

There are thus the following advantages and important features of the subject semi-automatic baiter and system. Limited storage space. By using leader attachments and coiling the ground-line separately, storage is less bulky. One man can operate the baiter and system. Other systems require at least two men and usually use more. The need to repair leaders can be deferred using the subject system. Such repair must be done after each haul when using other systems. All types of leader material can be used including stiff or limp. The baiter can use a wide range of hook sizes. The bait variety is random and thus the baiter can use a wide range of bait size and material. Minimum bait damage is caused because the line and attachment are passed through a bait separator. The baiter is relatively simple in construction and is not prone to breakdown. It can be repaired with simple tools. The baiter handles all conventional types of ground-line material, including stiff monofilament. The hook-holders and the storage rack are easily hand portable by one man.

The subject invention consists of an apparatus for use in association with baiting the hooks of longline for deep sea fishing and comprises a receptacle for holding pieces of bait and a bait longline separator mean disposed in association with the receptacle and extending substantially from one end of the receptable to the other.

The apparatus may include a separator which has therein a slot extending substantially from one end of the separator to the other.

The apparatus may include a holder for fish hooks located in line with the receptacle and the separator.

The apparatus may include a bait catching receptacle located in line with the bait receptacle on the end opposite the end of the bait receptacle proximate to the hook-holder, the bait catching receptacle having therein a slotted separator extension that is aligned with the separator associated with the bait receptacle.

The apparatus may include a groundline fair lead located proximate to the end of the hook-holder removed from the receptacle and separator.

The apparatus may include bait restraining brushes located at each end of the separator and receptacle.

The apparatus may include a bait catching receptacle located in line with the bait receptacle on the end opposite the end of the bait receptacle proximate to the hook-holder, the separator being disposed within the bait receptacle, the bait catching receptacle having therein a slotted separator extension that is aligned with the separator in the bait receptacle, and the separator extension including damping means for preventing hooks from swinging under the separator extension.

In the apparatus, the damping means may be a perpendicular plate located under the separator extension and extending substantially the length of the separator extension.

In the apparatus, the hook-holder, or an extension thereof, may extend over the bait receptacle.

The apparatus may include a fair-lead for supporting the weight of and guiding the longline which is located at the end of the apparatus proximate to the hook-holder, and a wear-plate for supporting the weight of and guiding the longline which is located at the end of the apparatus opposite to the fair-lead.

The invention is directed to method of baiting the hooks of longline for deep sea fishing comprising moving the groundline for the longline past a bait-ground-line separator positioned in association with a receptacle holding pieces of bait and periodically attaching fish hook leaders comprising attaching means, gangion and fish hook to the moving groundline so that the portion of the leader attaching to the groundline passes through the bait-groundline separator, and a portion of the gangion and the fish hook extends beyond the separator whereby the hook by means of movement of the groundline embeds itself in one of the pieces of bait and thereby becomes baited.

In the method according to the invention the leaders are stored on a hook holder which orients and positions the hooks for enhancing the bait hooking ability of the hooks, and orients the leader for enhancing the attachment of the leader attachment means to the groundline.

In the method according to the invention the groundline and the attached leaders, after the hooks thereof become baited by passing through the bait holding receptacle, pass through a separator extension that is axially aligned with the bait-groundline separator and is disposed in association with a receptacle that retains any bait that may fall off the baited hooks.

In the method according to the invention, after the leaders with hooks become baited, the leaders, hooks and bait pass through bait restraining brushes.

In the method according to the invention, baited hook damping means are positioned in association with the separator extension for preventing the baited hooks from swinging freely or becoming entangled with the groundline or the bait catching receptacle.

In the method according to the invention, groundline fair-lead means are used for supporting the weight of and guiding the groundline by the hook holding means and into the bait-groundline separator, and wearplate means are used to support the weight of and guide the groundline from the bait catching receptacle.

DRAWINGS

In the drawings:

FIG. 1 represents a perspective view of the baiter;
FIG. 2 represents a side elevation view of the baiter;
FIG. 3 represents a top elevation view of the baiter;
FIG. 4 represents a partially cut away side elevation view of the baiter;
FIG. 5 represents an exploded perspective view of the principal components of the baiter;
FIG. 6 represents a detailed side elevation view of the brushes;
FIG. 6a represents a detailed top elevation view of the brushes;
FIG. 7 represents an end elevation view of the baiter showing fairleads;
FIGS. 8, 9, 10 and 11 represent section views taken respectively along section lines A—A, B—B, C—C and D—D of FIG. 2;
FIG. 12 represents an end elevation view of the baiter taken from the end opposite the fairleads;
FIGS. 13 and 14 represent detailed end elevation views of the hook holder and leader;
FIG. 15 represents a detailed view of the construction and components of a leader;
FIGS. 16 and 17 represent side and top views respectively of a boat setting long-line gear using the baiter;
FIGS. 18 and 19 represent side and top views respectively of a boat hauling long-line gear.
FIGS. 20, 20a and 20b represent perspective, side and end elevation views of a wear plate.

DETAILED DESCRIPTION OF AN EMBODIMENT OF THE INVENTION

Figure 1:
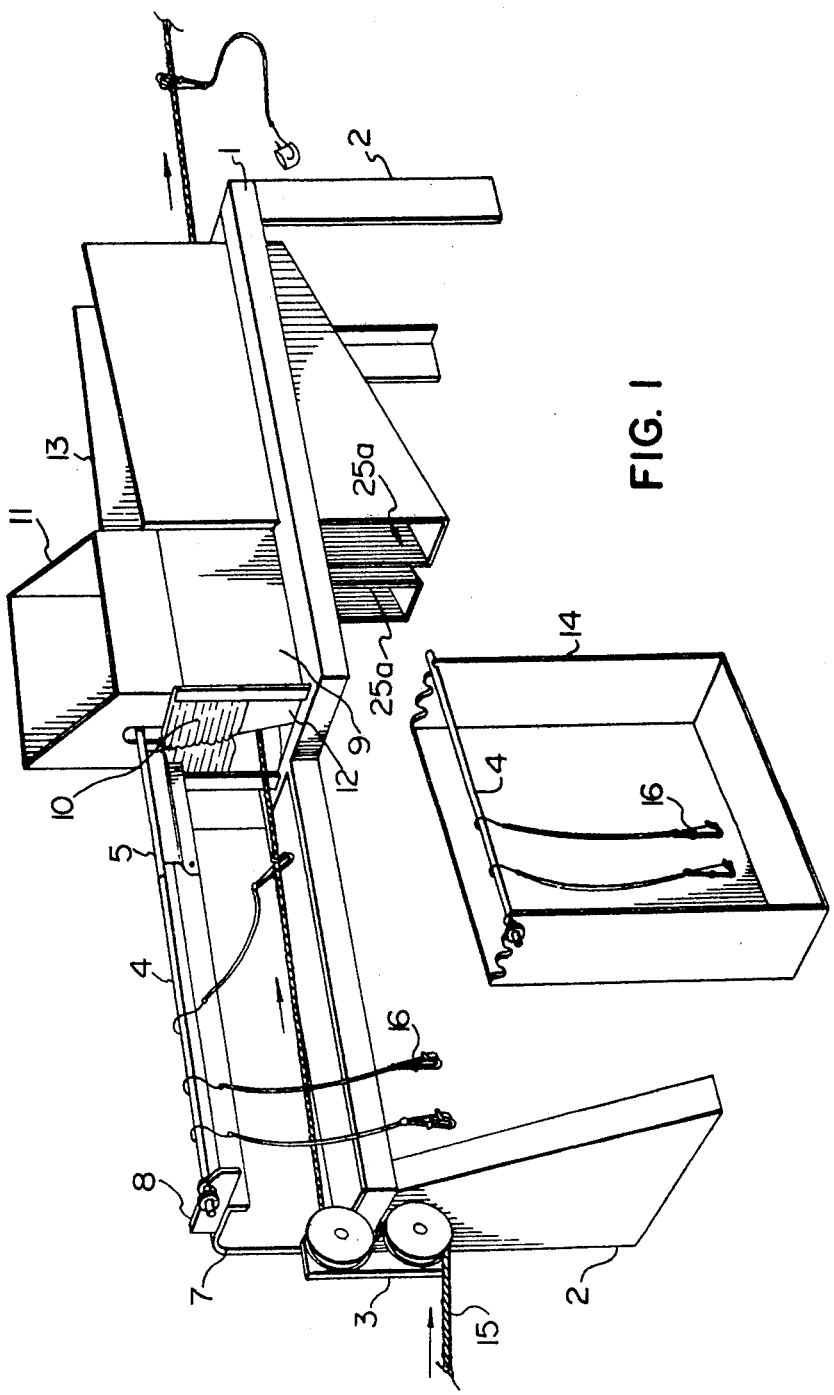

Referring to FIG. 1, the semi-automatic long line baiter consists of a table 1, with stabilizing legs 2 at each end, a fairlead 3 at one end, a hook holder 4 (for holding the hook, fastened to the gangion, swivel and snap, all of which collectively are called a leader 16), a slider 5, a plastic spring 6 (not shown in FIG. 1), a bracket 7, and a notched plate 8 located above the table 1 and the fairlead 3 end, a bait box 9, a set of brushes 10, a hopper 11, a separator 12 (partially concealed from view in FIG. 1) located in the middle of the table 1, a bait catcher 13 located at the end of the table 1 opposite the fairleads 3, and a storage rack 14 with a bar-like hook holder 4.

FIG. 1 also shows how the ground line 15 is fed through the baiter, picking up the attachment of the leader 16.

The table 1 may be made of 3/16 aluminum, cut and drilled to hold the other parts. The table 1 may typically be approximately 8 feet 6 inches long by 1 foot 6 inches wide, standing about 3 feet high. The legs 2 at each end may also be constructed of aluminum.

The fairlead 3 may be constructed of two deeply grooved rollers, which guide the ground line 15 into the working space.

The hook holder 4 may be made of a piece of stainless steel pipe, $\frac{1}{4}$ inch inner diameter $\times \frac{1}{2}$ inch outer diameter, for corrosion resistance, with two stainless steel washers welded in place at the left end to keep it in place in the baiter or in the storage rack 14.

The slider 5 may be made of a piece of $\frac{1}{2}$ inch outer diameter stainless steel round bar, 15 inches long, the left end having a spigot turned onto it so that it will fit easily into the end of the hook holder 4, keeping the right hand end of the holder in place on the baiter. It also extends into the bait box 9 for a certain distance, to allow the hooks to slide easily along the hook holder 4, onto the slider 5, then well into the bait box 9. In this way, the hooks drop into the bait box 9, well away from the walls, thereby eliminating the chance of the hooks becoming caught on the walls of the bait box 9.

The plastic spring 6 (shown in FIG. 2) is typically held in a metal bracket above the hook holder 4 and slider 5 to exert a firm downwardly pressure on the hooks hung on the holder 4, thereby preventing the hooks from jumping off when sliding along the holder 4 and slider 5.

The bracket 7 may be made of aluminum and bolted to the table 1 to hold the assembled hook holder 4, plastic spring 6 and slider 5 in position.

The notched plate 8 can be constructed of aluminum and is typically welded to the upper, front, left surface of the bracket 7 to hold the left hand end of the hook holder 4 in place (as seen in FIG. 1).

The bait box 9 can also be made of aluminum, typically ⅛ inch in thickness and approximately 6 inches wide, 14 inches high, and 20 inches long. The bait box 9 is designed to contain mass of pre-cut bait, through which the hooks will pass.

The brushes 10 may consist of four sections of industrial-sweeper brushes approximately ⅜ inch thick, 5 inches wide and 14 inches long. These are set in slots at the ends of the bait box 9 to hold the bait in the bait box 9, yet allow the hooks and lines to pass through.

The hopper 11 can be made of ⅛ inch aluminum and slips over the open top of the bait box 9. It is designed to contain a top-load, or head, of cut bait so that the end of the slider 5 where the hooks are released into the bait box 9 is always buried in bait.

The separator 12 is preferably made of 16 gauge stainless steel sheet for corrosion resistance. It may be fastened to the bottom of the bait box 9 and is flared at the left hand end to encourage entry of the leader 16. It is slotted along the top in order to permit part of the leader 16 and the hook to extend into the bait in the bait box 9 while conveying the ground-line 15 and attachment through the bait without contacting the bait. This prevents damage to the bait by contact of the bait with the attachment, the ground-line 15, and any knots that may exist.

The bait catcher 13 can be made of 20 gauge stainless steel sheet. It extends from the right hand end of the bait box 9 (as seen in FIG. 1) to the end of the table 2 and is sloped to allow excess bait to fall back into a basket (not shown). It also contains an extension 25 to the separator 12 that in effect continues the separator 12 to the right hand end of the bait catcher 13 (as seen in FIG. 1). The walls 25a of the separator extension 25 extend to the floor of the bait catcher 13 so as to prevent the passing hooks, with bait on them, swinging freely underneath the extension 25 and becoming tangled or running under the groundline thereby preventing knocking the bait off the hooks.

The storage rack 14 can also be made of aluminum. It is preferably flanged at the sides and is notched along the top to hold the hook holders 4.

FIG. 2 depicts a side elevation view of the baiter. The fairleads 3 are mounted at one end of the table 1. The hook holder 4 is mounted above and to the right of the fairleads 3 in association with slider 5, spring 6, bracket 7 and notched plate 8. These lead into the bait box 9, which in turn lead into the bait catcher 13. Note that the slider 5 extends out over the bait box 9 to ensure that the hooks drop into the mid-region of the bait box so that the hooks will not catch on the walls of the bait box 9.

FIG. 3 represents a top elevation view of the baiter, with fairleads 3, hook holder 4, slider 5, bracket 7, notched plate 8, bait box 9 and brushes 10. This view shows in good detail the separator 12 which extends in line with and connects to extension 25, thereby providing a continuous aligned passage through bait box 9 and bait catcher 13. This view also shows the position of wear plate 24, which is secured to the end of extension 25. The wear plate 24 (to be discussed in greater detail in association with FIGS. 20, 20a and 20b) provides a wearing and bearing surface for the ground-line 15 which under operating conditions exerts a substantial force (hundreds of pounds) on the end of extension 25.

FIG. 4 illustrates a partially cut-away side view of the baiter which demonstrates the manner in which a ground-line 15 is threaded through the fairleads 3, under the hook holder 4, through separator 12 of the bait box 9 and finally through the extension 25 and bait catcher 13. The leader 16 of the hooks 17 that are hung on the hook holder 4 are attached by a suitable attaching device onto the travelling ground-line 15 periodically at desired intervals. FIG. 4 shows in sequence how the hook 17 is pulled off the end of the slider 5 (well over the bait box 9) and after picking up bait from the bait box 9, passes through the bait catcher 13.

FIG. 5 represents an exploded perspective view of the principal components that make up the baiter, and the manner in which they are assembled, namely the hook holder 4, the slider 5, the spring 6, the notched plate 8, the bait box 9 (with brushes 10 and separator 12) and the bait catcher 13 also with extension 25, with support walls 25a. Also shown is the hopper 11, which fits partially within the bait box 9.

FIGS. 6 and 6a represent detailed front and top elevation views of the brushes 10 with bristles and their manner of construction. The bristles 10b are clamped into linear U-shaped spines 10a.

FIG. 7 depicts an end elevation view of the baiter taken from the fairleads 3 end and showing hook holder 4, spring 6, bracket 7, notched plate 8, bait box 9 and brushes 10.

FIGS. 8, 9, 10 and 11 represent respectively section views taken along section lines A—A, B—B, C—C and D—D of FIG. 2 and show variously, as applicable, the bait holder 4 with spring 6 and bracket 7, the bait box 9 with separator 12 and finally the bait catcher 13 with extension 25. The orientation of the leader 16 should be noted as it passes from section A—A through to section D—D. Note in FIGS. 11 and 12 that the narrow passage through which the baited hook travels prevents the baited hook from swinging freely, thereby ensuring that the baited hook passes freely without entanglement through the catcher 13.

Figure 12:
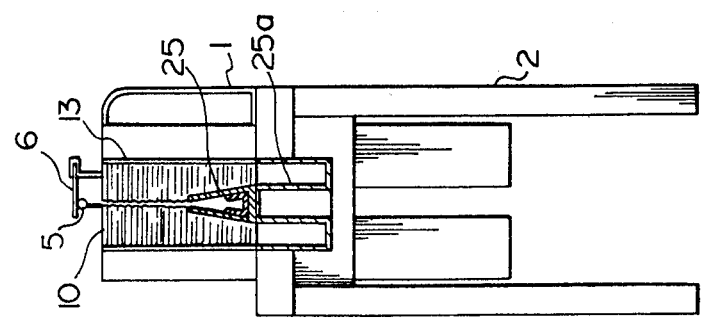

FIG. 12 represents an end elevation view of the baiter taken from the end opposite the fairleads 3. It shows the table 1, legs 2, slider 5, spring 6, brushes 10, extension 25, bait catcher 13, and wearplate 24.

Figure 13:
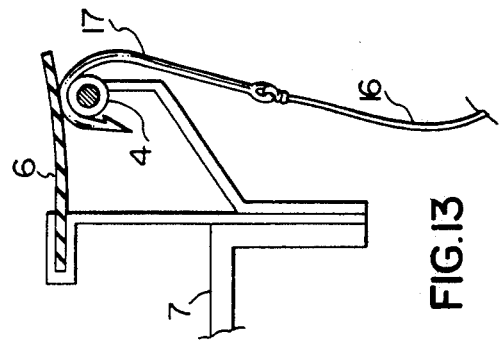

FIG. 13 illustrates a detailed view of the preferred manner in which the hook 17 is held onto the hook holder 4 by the flexible plastic 6 which is attached to the bracket 7, the leader 16 hanging by means of the hook 17.

Figure 14:
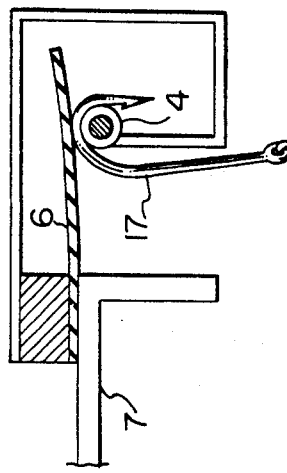

FIG. 14 demonstrates how the hook and leader 16 can be hung in reverse on the hook holder 4, with the spring 6 and bracket 7.

Figure 15:
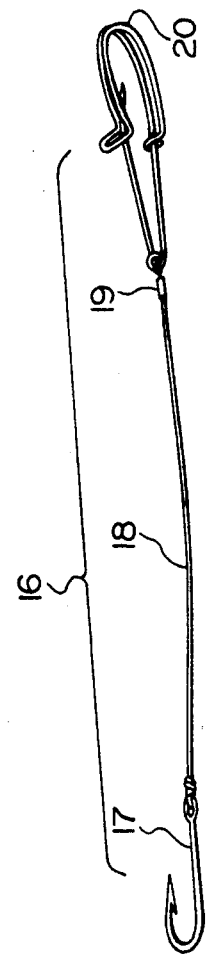

FIG. 15 illustrates the make-up of typical long-line leader fishing gear. The leader 16 is collectively made up of a fish hook 17, which is connected to a gangion 18, which by means of a swivel 19, is connected to the attachment 20. The attachment 20 is manually attached to the ground-line 15, which, after baiting of the hooks, is laid out along the ocean floor. The ground-line 15 may be made of ¼ inch or 5/16 inch diameter woven rope. The gangion 18 may be a piece of strong cord or monofilament, braided or twisted.

The ground-line 15 is wound up on or dispensed from a drum 22, hydraulically powered, that pays out the ground-line 15 when it is being laid on the ocean floor and hauls it in when the ground line 15 is wound onto the drum 22 and stored for future use.

Figure 16:
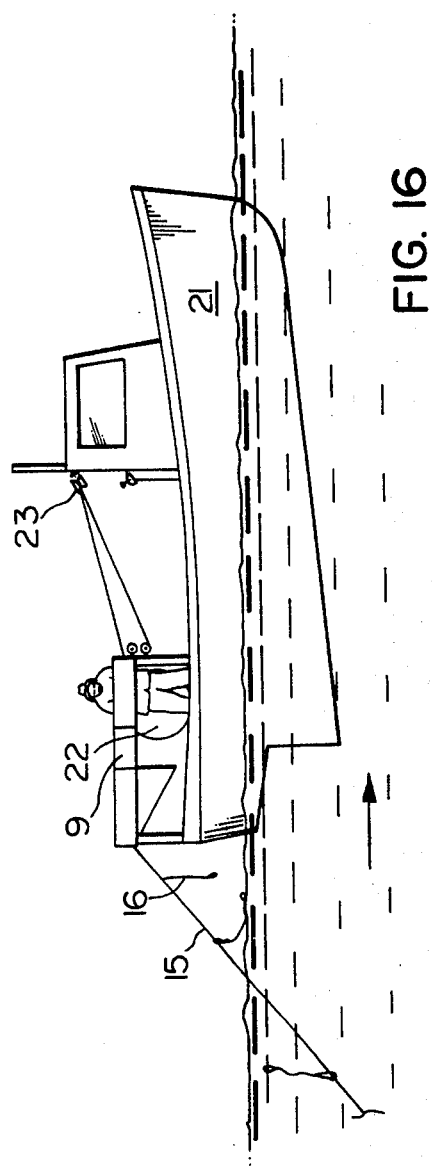
Figure 17:
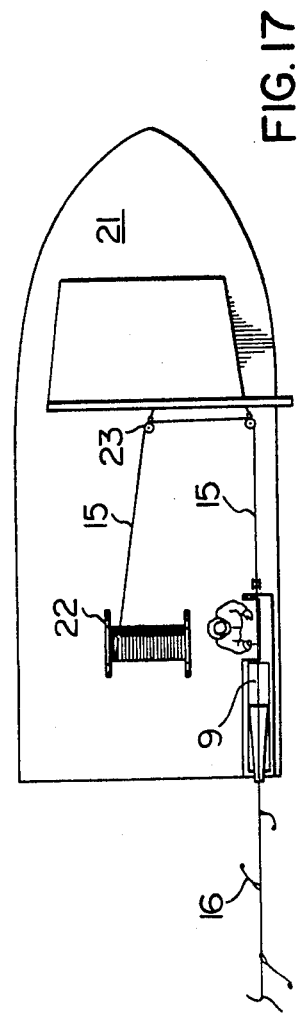

FIGS. 16 and 17 depict respectively, by means of side and top elevation views, the way in which long-line as baited with the semi-automatic baiter is set out from a fishing boat 21 using drum 22 and pulleys 23.

FIGS. 18 and 19 illustrate respectively, by means of side and top elevation views, the way in which the long-line with hooked fish is hauled into the fishing boat 21. The ground-line 15, when hauling in, bypasses the baiter and is wound directly onto the drum 22.

FIGS. 20, 20a and 20b illustrate in detail the construction of the wearplate 24 which is secured by some suitable means to the end of the extension 25. The wearplate is designed to conform with the shape of the extension 25 and is readily replaceable. The ground-line 15, especially when it has been laid out on the ocean floor, exerts hundreds of pounds of force on the end of the baiter. The wearplate 24 is designed to withstand this force and to provide a smooth replaceable wearing and bearing surface over which the ground-line 15 and the attachments 20 can pass.

The operation of the baiter in association with long-line fishing and a fisherman is discussed as follows.

Making Ready

The leaders 16 are stored on the hook holders 4 and the hook holders 4 are stored in the storage rack 14. The ground-line 15 and the buoy line are coiled onto the drum 22. The anchors and buoys are arrayed at the after rail of the boat 21. The bait is cut into buckets, and some is poured into the hopper 11 filling the bait box 9 and the hopper 11.

The clutch on the drum 22 is then put into neutral, allowing it to freewheel. The end of the buoy is seized at the drum 22 and is led through the snatch blocks, then back to the baiter where it is passed round the fairleads 3 and threaded through the tube 12 until it can be seized at the after end of the bait catcher 9. Some slack is pulled through, and the buoy line is tied to the buoy and flagpole. The gear is then ready to set.

Setting Gear

The boat 21 is set in motion forward and the buoy and flagpole are cast away astern. Their drag in the water pulls the buoy line off the drum 22 and away from the boat 21. When the buoy line is entirely pulled out, the drum 22 is braked and the line is stopped. The buoy line is tied to the ground-line 15 when stored on the drum 22, so it will have pulled the free end of the ground-line 15 through the blocks, fairleads 3 and tube 12 until it is visible at the aft end of the eaiter. At this point, the anchor is tied onto the ground-line 15 and is also cast away astern.

The boat 21 is then slowed to a gentle pace as the weight of the anchor, having fallen to the bottom, will continue to pull the ground-line 15 off the drum 22. As long as the boat 21 moves away from the anchor it will continue to unreel ground-line 15, so all the while the ground-line is passing through the baiter, heading outboard.

A hook holder 4 is removed from the storage rack 14, pushed up under the spring 6 and is set in place on the slider 5 (the right end slipped over the spigot, the left end resting in the notched plate 8). There may be from 125 to 150 leaders on the holder 4.

The operator takes the far right hand leader 16 by the attachment 20 with his right hand, attaches the attachment 20 to the ground-line 15, and then quickly removes his hand. The moving line 15 carries the attachment 20 away into the separator 12 pulling the leader 16 with hook 17 along the holder 4 and slider 5 and through the brushes 10 into the bait box 9.

Once well into the bait, the hook 17 falls off the end of the slider 5 and in dragging through the bait, barb-forward, randomly spears a chunk of bait in its path. When the hook 17 reaches the next set of brushes 10 at the right hand end of the bait box 9, the brushes 10 exert a gentle pressure that sets the bait on the hook 17 and pulls off only lightly hooked pieces.

The attachment 20 and ground-line 15 continue along in the separator 12 and when the gangion 18 and hook 17 pull through the brushes 10, they carry other loose chunks of bait with them. These fall to the sloped floor of the bait catcher 13 and tumble back into a basket for re-use. The end of the leader 16 with the baited hook 17 protrudes up through the slot on top of the separator 12 and hangs down along the side of the separator 12, and subsequently the extension 25.

The distance from the top of the slot to the bottom of the catcher 13 at the far right end is greater than the length of the leader 16 that is protruding. This is so the baited hook 17 will not hit the edge as it leaves the boat. This reduces bait loss. At this point, the leader 16 leaves the baiter and the boat 21 and, remaining attached to the ground-line 15, falls to the ocean floor.

This process is continued, the leaders 16 being placed at any spacing, until the entire "string" of ground-line 15 is paid out and the next buoy line is reached. Then the drum 22 is braked again, the next anchor is tied to the end of the buoy line and is cast off astern. The boat 21 continues forward until all of the buoy line is pulled off the drum 22. The drum 22 is again braked, the free end of the buoy line is untied and attached to the buoy and flagpole, and they are cast off astern. In this way, an entire "string" is set out, with baited leaders 16 on it, is anchored, buoyed, and is left on the ocean floor for the fish to find.

Hauling Gear

When the gear has soaked long enough on the ocean floor to catch a batch of fish, the boat operator searches for the flagpoles, and comes alongside one of them. He seizes it and pulls it on board. The buoy and flagpole are untied and stowed away at the stern rail. The free end of the buoy line is then passed through the blocks and tied to the free end of the line coiled on the drum 22. The drive clutch of the drum 22 is engaged and the hydraulic motor started. Coiling in the buoy line begins. The anchor pulls up from the bottom, bringing with it the ground-line 15 and any fish that have taken the hooks. When the anchor arrives at the rail, the drum 22 is stopped, the anchor is untied and stowed aft, and the drum 22 restarted. Now ground-line 15 and leaders 16 are being hauled. As the leaders 16 come up to the rail, the attachment 20 is unclipped. Those with fish can be thrown onto the deck. Empty hooks 17 may be stowed on the hook holder 4 in the rack 14. This continues until the other end of the ground-line 15 is reached. The other anchor is hauled up, detached and stowed. The buoy line is hauled in onto the drum 22 until the last buoy and flagpole come aboard. They are then untied and stowed. The hooks 17 are removed from the jaws of the fish and the remaining leaders 16 are stowed on the hook holder 4. All is then ready to be set out again.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The embodiments of the invention in which an exclusive property or privilege is claimed are defined as follows:

1. Apparatus for use in association with baiting hooks attached by leaders to longline for deep sea fishing comprising:
   (a) a receptacle for holding a plurality of pieces of bait;
   (b) a bait longline separator means disposed adjacent the receptacle and extending substantially from one end of the receptacle to the other, the separator having therein a slot extending substantially from one end of the separator to the other;
   (c) longline guide means for directing the longline along the side of the separator opposite the receptacle so that the leaders attaching hooks to the longline extend through the slot while the hooks at the ends of the leaders removed from the longline pass through the receptacle; and
   (d) a bait catching receptacle located in line with the bait receptacle on the end opposite the end of the bait receptacle proximate to the hook holder, the bait catching receptacle having therein a slotted separator extension aligned with the separator associated with the bait receptacle.

2. Apparatus according to claim 1 wherein a holder for fish hooks is located in line with the receptacle and the separator.

3. Apparatus according to claim 1 or 2 wherein a ground line fair-lead is located proximate to the end of the hook holder removed from the receptacle and separator.

4. Apparatus according to claim 1 or 2 wherein bait restraining brushes are located at each end of the separator and receptacle.

5. Apparatus according to claim 1 wherein the separator is disposed within the bait receptacle, the bait catching receptacle having therein a slotted separator extension that is aligned with the separator in the bait receptacle and the separator extension includes damping means for preventing hooks from swinging under the separator extension.

6. Apparatus according to claim 5 wherein the damping means is a perpendicular plate located under the separator extension and extending substantially the length of the separator extension.

7. Apparatus according to claim 6 wherein the hook holder, or an extension thereof, extends over the bait receptacle.

8. Apparatus according to claim 7 wherein a fairlead for supporting the weight of and guiding the longline is located at the end of apparatus proximate to the hook holder and a wear plate for supporting the weight of and guiding the longline is located at the end of apparatus opposite to the fairlead.

* * * * *